United States Patent
Jha et al.

(10) Patent No.: US 10,178,562 B1
(45) Date of Patent: Jan. 8, 2019

(54) TRACKING AREA OPTIMIZATION

(71) Applicant: Cisco Technology, Inc., San Jose, CA (US)

(72) Inventors: Atul Kumar Jha, Bangalore (IN); Shashank Misra, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/796,808

(22) Filed: Oct. 29, 2017

(51) Int. Cl.
*H04W 24/00* (2009.01)
*H04W 24/02* (2009.01)
*H04W 8/12* (2009.01)
*H04W 68/02* (2009.01)
*H04W 24/08* (2009.01)

(52) U.S. Cl.
CPC ............ *H04W 24/02* (2013.01); *H04W 8/12* (2013.01); *H04W 24/08* (2013.01); *H04W 68/02* (2013.01)

(58) Field of Classification Search
CPC ........ H04W 24/02; H04W 8/12; H04W 68/02
See application file for complete search history.

(56) References Cited

U.S. PATENT DOCUMENTS

| | | | |
|---|---|---|---|
| 8,886,202 B2 | 11/2014 | Wang et al. | |
| 9,191,835 B2 | 11/2015 | Guan et al. | |
| 9,485,701 B2 | 11/2016 | Wang et al. | |
| 9,888,455 B1 * | 2/2018 | Laslo-Amit | ............. B61L 25/02 |
| 2011/0171979 A1 * | 7/2011 | Rune | ...................... H04W 24/02 455/458 |
| 2017/0063621 A1 | 3/2017 | Sanneck et al. | |
| 2017/0171801 A1 * | 6/2017 | Viering | .................. H04W 48/16 |
| 2018/0184246 A1 * | 6/2018 | Ryu | ........................ H04W 8/02 |

FOREIGN PATENT DOCUMENTS

WO      2017088903      6/2017

OTHER PUBLICATIONS

Modarres Razavi, Sara et al; "Planning and optimization of Tracking Areas for Long Term Evolution Networks." PhD diss. Linköping University Electronic Press, 2014. [Linköping Studies in Science and Technology. Dissertations, No. 1588. ISBN 978-91-7519-360-1.

* cited by examiner

*Primary Examiner* — Khai M Nguyen

(57) ABSTRACT

In one embodiment, a system instantiated in memory is executed by a processor to: select cells to optimize in a mobile network where the cells are associated with at least one control signal load exceeding a threshold, where the threshold is for at least one of tracking area update (TAU) load or paging load, reconfigure the cell's tracking area (TA) by either adding at least one additional cell from another TA to the cell's TA and/or removing at least one other cell from the TA, temporarily implement the reconfigured TA in the mobile network, receive updated control signal data for cells affected by said reconfigured TA, and save the reconfigured TA in the mobile network if the at least one control signal load is under the threshold and the second control signal load is under an associated second control signal load threshold for the cells affected by the reconfigured TA.

26 Claims, 9 Drawing Sheets

US 10,178,562 B1

TRACKING AREA OPTIMIZATION

TECHNICAL FIELD

The present invention generally relates to the optimizing of tracking areas in mobile networks.

BACKGROUND

The cells of a mobile network are typically organized into tracking areas (TAs). The mobile network uses TAs to determine an approximate location of a user equipment (UE) that is not in direct communication with the mobile network, e.g., when the UE is in an idle state.

There are at least two types of control signals used in conjunction with TAs in a mobile network. One such control signal is a tracking area update (TAU) signal; when a UE is turned on or enters a cell associated with a new TA, it sends a TAU signal to the mobile network. The TAU signal indicates to the mobile network that the sending UE is in one of the cells of a given TA. A second control signal, a paging signal, may be sent by the mobile network to initiate communication with the UE, for example, when facilitating an incoming call session. The paging signal is used to page the UE in each of the cells of the TA indicated by a most recently received TAU signal.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

A tracking area (TA) optimization system includes: a processor, a memory, and a TA optimization manager application instantiated in the memory and configured to be executed by the processor to at least: use control signal data to select at least one cell to optimize in a TA of a mobile network where the at least one cell is associated with at least one control signal load that exceeds an associated control signal load threshold where the at least one control signal load is determined according to the control signal data and is at least one of tracking area update (TAU) load or paging load, reconfigure the TA to form a reconfigured TA by at least one of: adding at least one additional cell from another TA to the TA or removing at least one other cell from the TA, temporarily implement the reconfigured TA in the mobile network, for a configurable period of time receive updated control signal data associated with both the at least one control signal load and a second control signal load for cells affected by the reconfigured TA, and upon determining according to the updated control signal data that the at least one control signal load is under the associated control signal load threshold and that the second control signal load is under an associated second control signal load threshold for the cells affected by the reconfigured TA, save the reconfigured TA for continued use in the mobile network.

Detailed Description of Example Embodiments

It will be appreciated by one of skill in the art that the size and configuration of tracking areas (TAs) directly impact the amount of Paging and Tracking Area Update signaling in a mobile network. A larger TA, i.e., a TA with relatively more cells, has a relatively greater paging load, and a relatively smaller TAU load. Conversely, reducing the size of a given TA decreases the paging load, and increases the TAU load.

For example, in an extreme case of a mobile network where every cell belongs to a single TA, once an initial TAU would be sent on power-on, UEs would not send any TAUs at all. However, every paging signal for every UE would be sent to every cell in the mobile network. In the opposite case, where every cell in the network would be defined as a separate TA, a UE would send a TAU every time it moved from one cell to another, but paging signals would be sent to the UE only one cell at a time.

In accordance with embodiments described herein, a number of methods may be used to optimize the size and configuration of TAs in order to conserve the network resources used for TAUs and paging signals. Thresholds may be set for the number of TAUs and/or paging signals to be associated with a given cell. Cells that exceed one or more of the thresholds may be selected for optimization. The optimization may leverage one or more key performance indicators (KPIs) to determine how an affected TA may be resized or reshaped in order to comply with the thresholds.

Figure 1A:
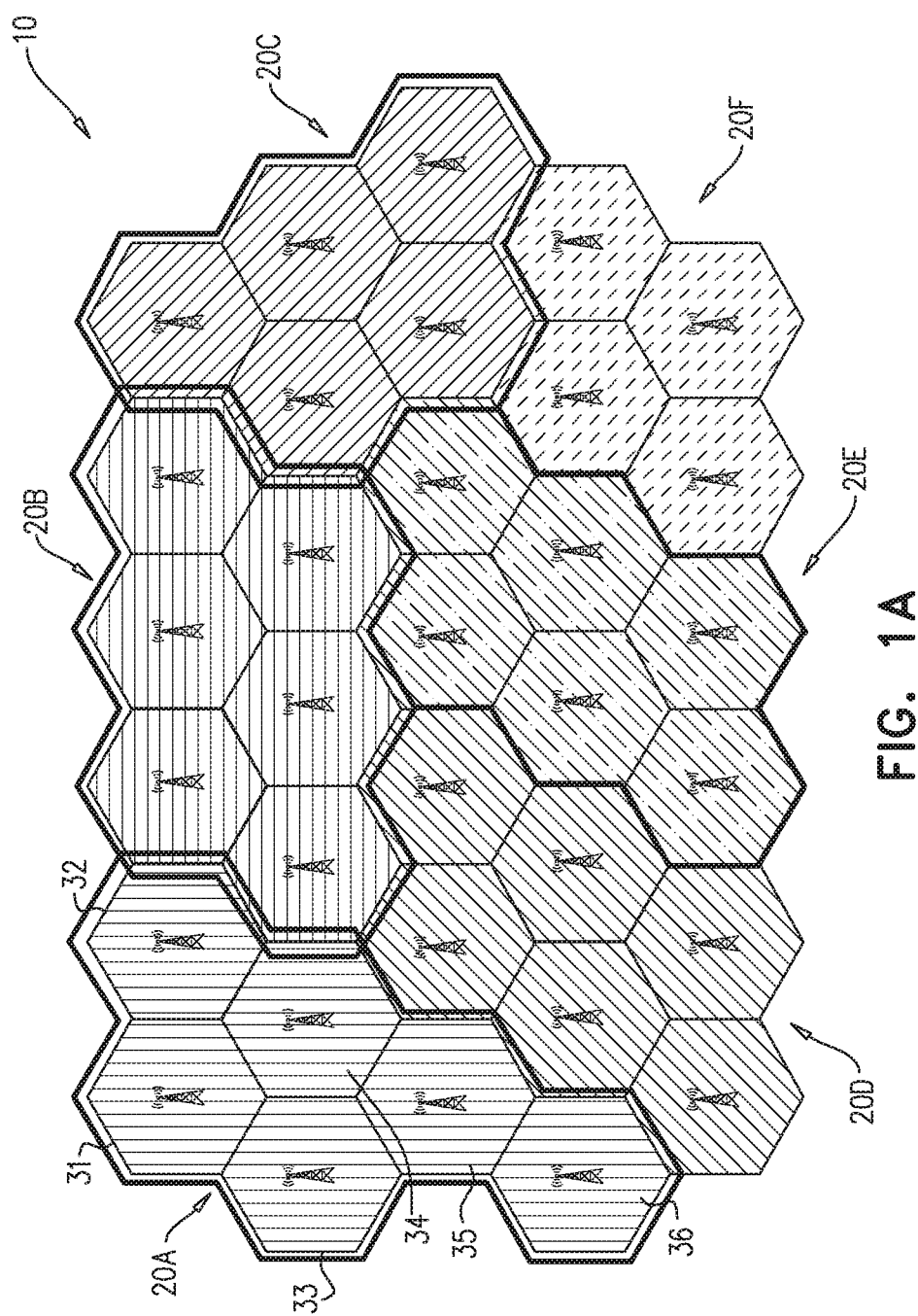
FIGS. 1A-E are pictorial illustrations of mobile tracking areas in accordance with embodiments described herein.

Reference is now made to FIG. 1A which is a pictorial illustration of an exemplary embodiment of a mobile network 10, constructed and operative in accordance with embodiments described herein. Mobile network 10 may be implemented as any suitable mobile network known in the art, such as, for example, a third generation (3G) network, long term evolution (LTE) network, or a fifth generation (5G) network. Mobile network 10 is organized into a multiplicity of TAs 20A-F (collectively referred to herein as "TAs 20"), where each one of TAs 20 (referred to herein as a "TA 20") comprises a multiplicity of mobile cells. For example, TA 20A comprises cells 31, 32, 33, 34, 35 and 36. It will be appreciated that each cell may be defined as the coverage of a mobile base station, for example, an eNodeB, physically located in the cell. As such, it will be appreciated that each cell in FIG. 1 may also represent a mobile base station providing connectivity between UEs and mobile network 10.

It will be appreciated that a mobile network may typically have more or less TAs 20 than depicted in FIG. 1A, and the network's TAs 20 may have more or less cells than cells 31-36 as depicted in FIG. 1A. It will also be appreciated that in the interests of clarity, the component cells of TAs 20B-F may not be explicitly labelled herein.

Figure 1B:
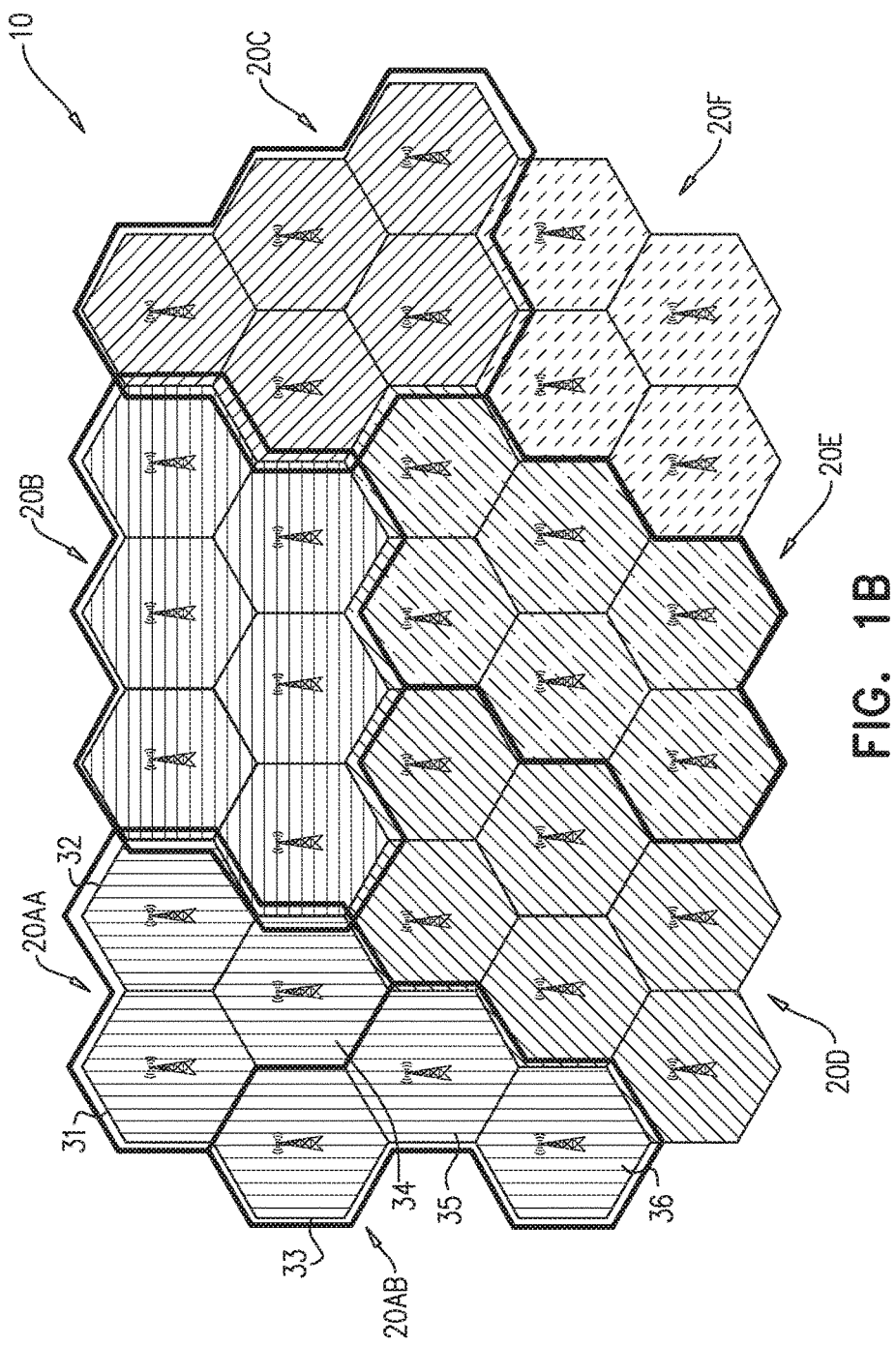

In accordance with embodiments described herein, the size of one or more of TAs 20 may be adjusted in order to optimize its TAU and paging loads. For example, per observation it may be determined by mobile network 10 that the paging load in TA 20A is too high, i.e., that the number of paging signals in a given period of time exceeds the defined thresholds for the paging load. In response, as depicted in FIG. 1B, to which reference is now made, TA 20A may be split into two TAs, herein referenced as TA20AA and TA 20AB. TA 20AA comprises cells 31, 32, and 34; and TA 20AB comprises cells 33, 35, and 36. It will be appreciated that each of TA 20AA and AB comprises a subset of the cells in original TA 20A, and accordingly, each will benefit from a relatively lower paging load.

It will also be appreciated, however, that the relatively lower paging load may be accompanied by a higher TAU load, since additional TAUs may now be sent for UEs being handed off between cells in TA 20AA and TA 20AB, whereas previously such TAUs would not have been necessary. For example, in the exemplary embodiment of FIG. 1B, a UE moving from cell 34 to cell 35 would send a TAU indicating a move from TA 20AA to TA 20AB; whereas in the exemplary embodiment of FIG. 1A, such a move would not represent a move into a new TA 20. Accordingly, depending on the circumstances, it may not be desirable to split TA 20A into TA 20AA and TA 20AB, as it would lead to excess TAUs in the newly formed TAs.

Figure 1C:
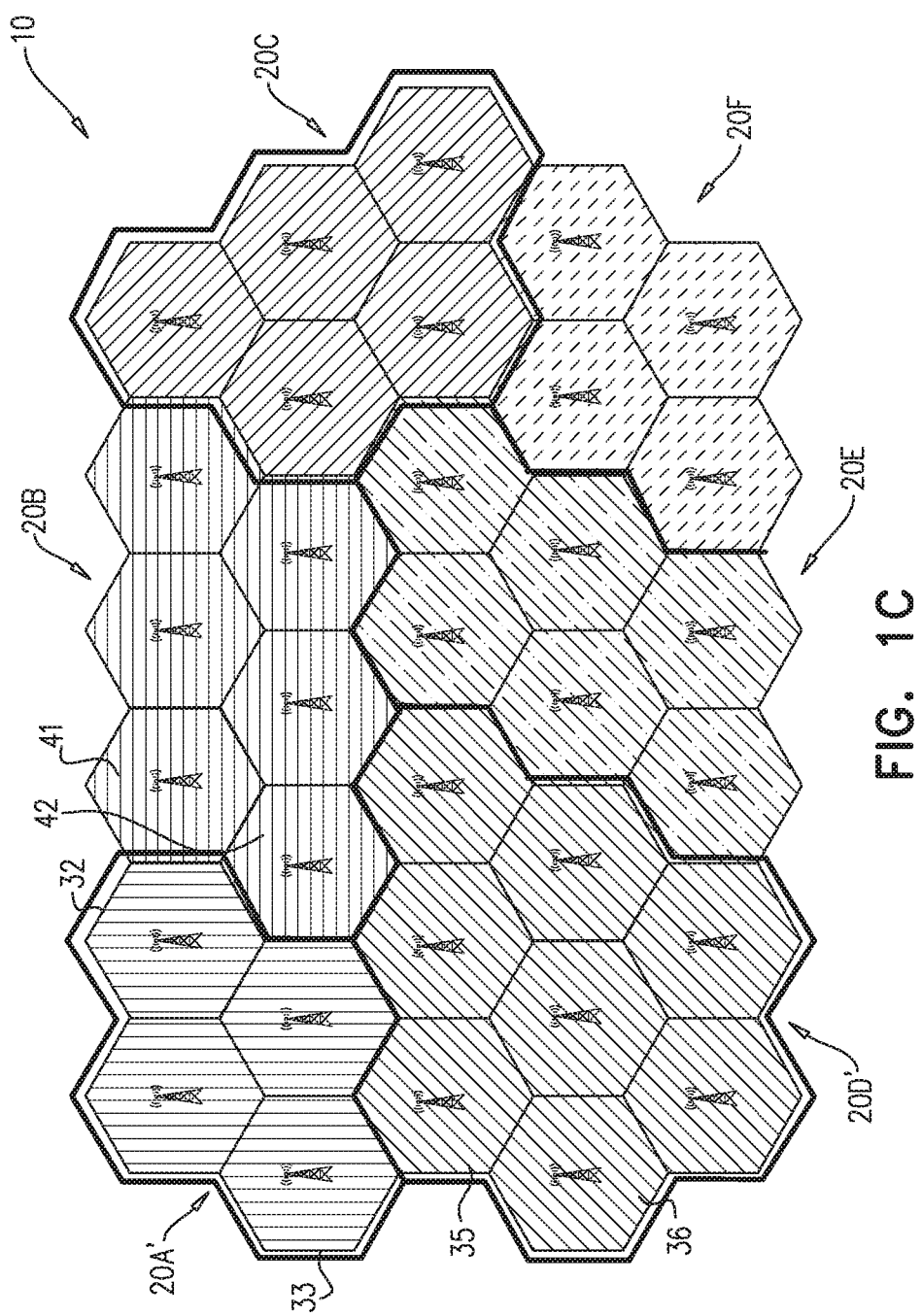

Alternatively, instead of splitting TA 20A (FIG. 1A) into TA 20AA and TA 20 AB, one or more component cells may be removed from TA 20A and added to a different TA. For example, as depicted in FIG. 1C, to which reference is now made, the paging load in original TA 20A may be reduced by moving cells 35 and 36 from original TA 20A to original TA 20D, thereby yielding TA 20A' and TA 20D' from the original TAs 20A and 20D. As will be described hereinbelow, cells 35 and 36 may be selected for removal from TA 20A in accordance with a KPI for successful handovers.

It will be appreciated, that TA 20A' may suffer an increase in TAU load relative to that experienced by original TA 20A; handovers between the cells in TA 20A' and cells 35 and 36 in TA 20D' may now be accompanied by TAUs, whereas previously, when cells 35 and 36 were in TA 20A, such handovers would not necessitate TAUs. In some cases, the resulting increase in TAU load may offset, or even exceed, the benefit realized by the resulting decrease in paging load. Accordingly, in accordance with alternative embodiments described herein, instead of reducing the size of original TA 20A, mobile network 10 may instead reshape TA 20A to generate TA 20A' as depicted in FIG. 1D, to which reference is now made.

Figure 1D:
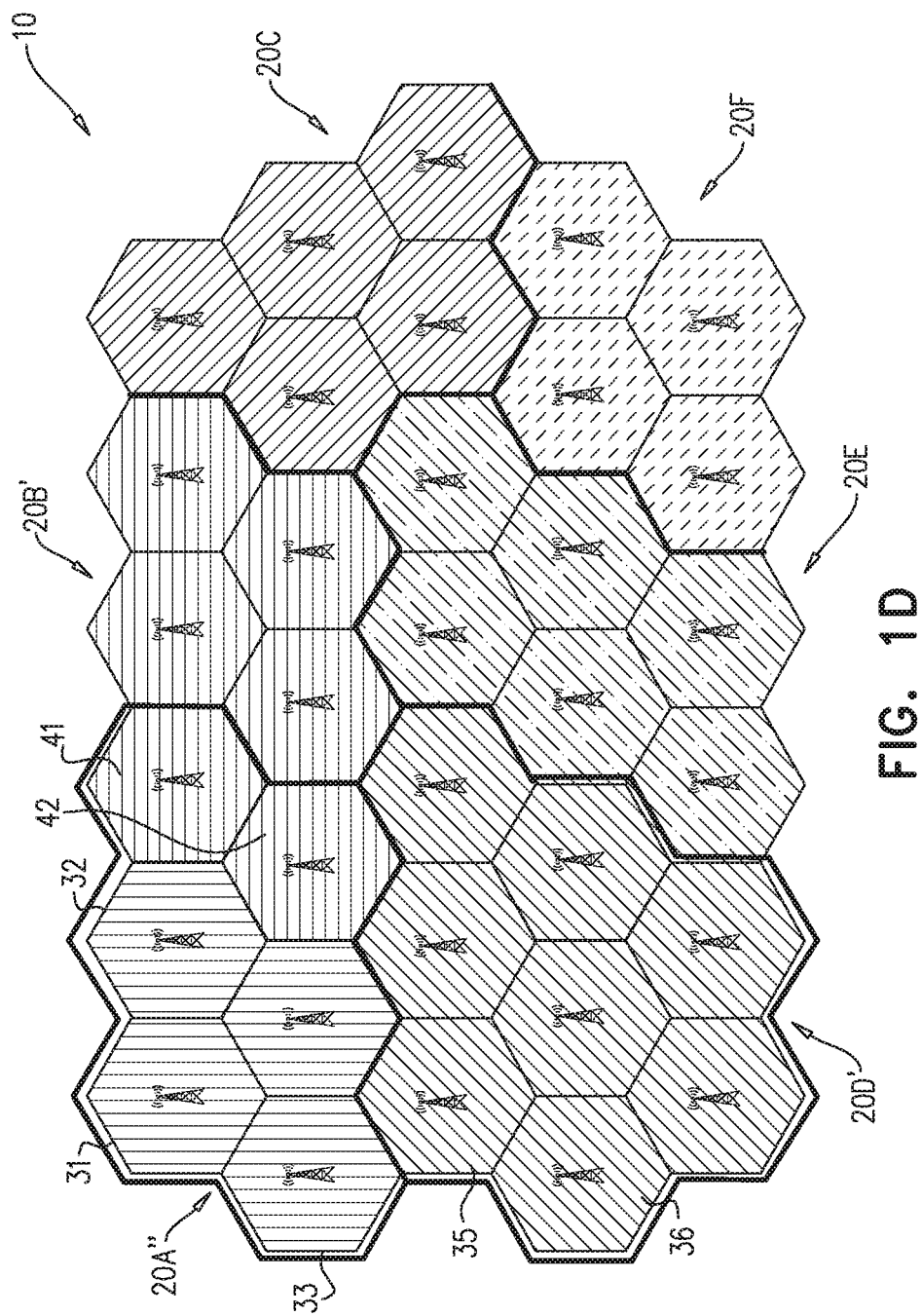

As depicted in FIG. 1D, mobile network 10 may reshape TA 20A by removing cells 35 and 36, as in the exemplary embodiment of FIG. 1C. However, in the exemplary embodiment of FIG. 1D, cells 41 and 42 may also be added to original TA 20A to generate TA 20A'. It will be appreciated that if the handover activity between original TA 20A and cells 41 and 42 exceeds the handover activity between original TA 20A and cells 35 and 36, the exemplary embodiment of FIG. 1D may represent an improvement vis-à-vis the exemplary embodiment of FIG. 1C with regard to TAU load. For example, cells 41 and 42 may include a highway that snakes in and out of some of the cells of original TA 20A (e.g., cells 32 and 43 in FIG. 1A). By including cells 41 and 42 in TA 20A', the TAU load increase caused by removing cells 35 and 36 may, in some cases, be more than offset by the TAU load decrease causing by adding cells 41 and 42??. It will be appreciated that the net effect of the exemplary embodiment of FIG. 1D on the paging load for TA 20A (as depicted in FIG. 1A) vis-à-vis TA 20A' may be a function of how whether or not there are usually more, or less, UEs active in TA 20A or TA 20A', and/or whether or not there is a difference in their usage patterns.

Figure 1E:
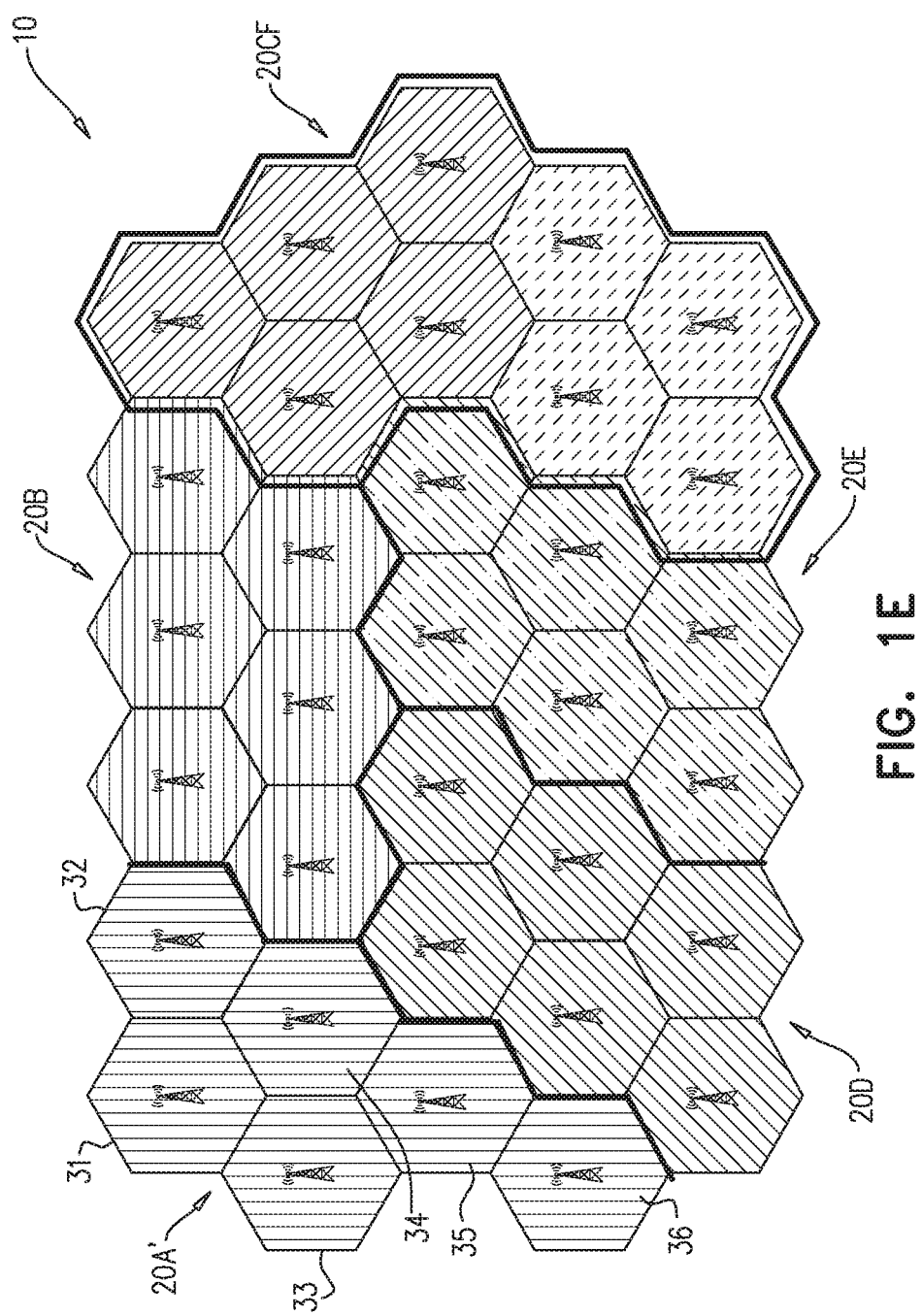

It will be appreciated that in accordance with some embodiments described herein, two or more TAs may be combined to form a single TA. For example, as depicted in FIG. 1E to which reference is now made, two TAs (e.g., TAs 20C and 20F from FIG. 1A) with a high TAU load caused by a high rate of inter-TA hand overs may be combined to form TA 20CF. It will be appreciated that in the exemplary embodiment of FIG. 1E, the paging load for TA 20CF may exceed that of the combined paging load for original TAs 20C and 20F (as depicted in FIG. 1A). The benefit to be derived by generating TA 20CF may therefore be effectively limited by whether or not original TAs 20C and 20F had a relatively low paging rate prior to their combination to form TA 20CF.

Figure 2:
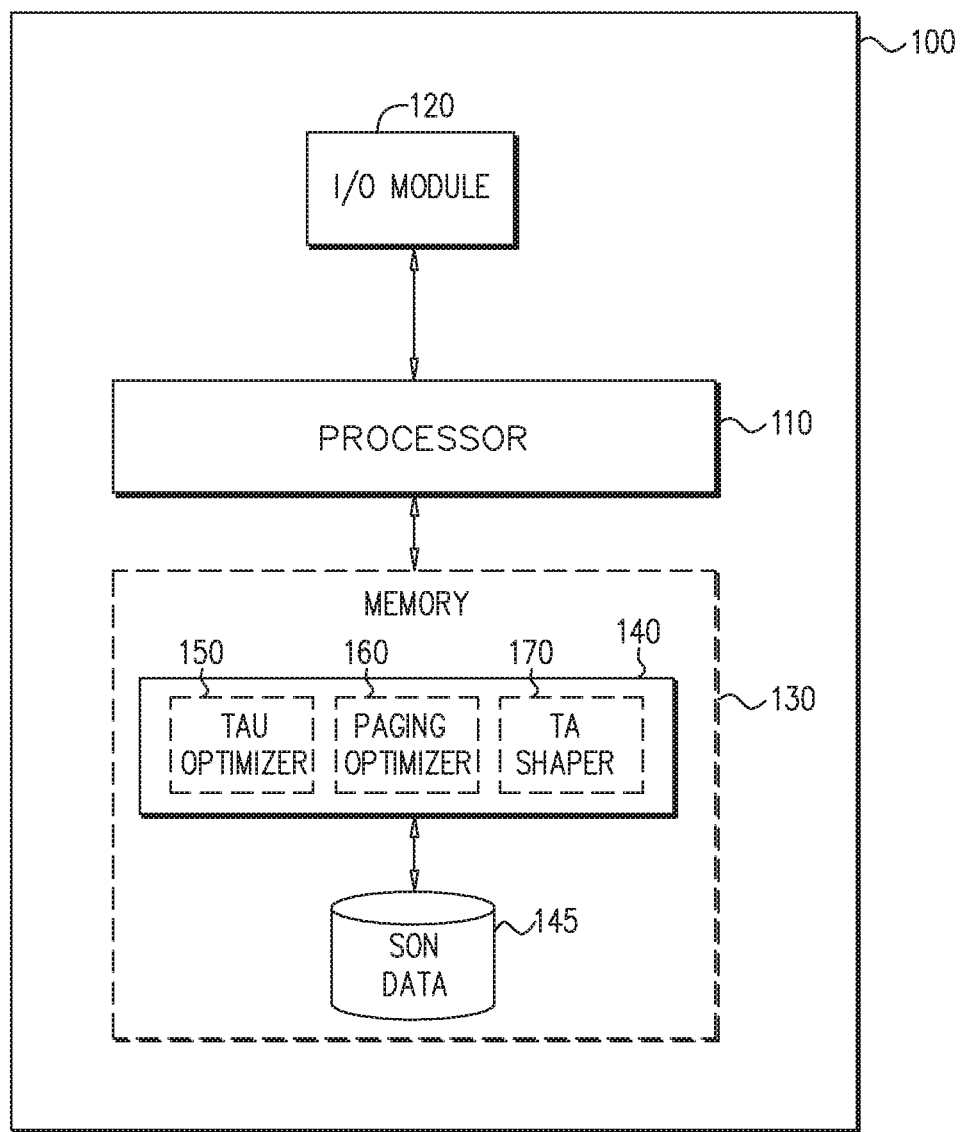
FIG. 2 is a schematic illustration of a tracking area optimizer server configured and operative in accordance with embodiments described herein to at least manage or optimize the tracking areas of FIGS. 1A-E.

Reference is now made to FIG. 2 which is a schematic illustration of a tracking area optimizer server 100, configured and operative in accordance with embodiments described herein to at least manage the configuration and/or size of TAs as described with respect to FIGS. 1A-E. Server 100 may be implemented using any suitable computing device(s) that may support the execution of TA optimization functions as described herein. For example, server 100 may implemented using hardware, software, and/or firmware on a multi-purpose personal computer, computer tablet, or smartphone. Server 100 may also be implemented on a communications router or switch, or on a dedicated Internet of Things (IoT) device. Server 100 may also be implemented as an integrated component on one or more of the elements of mobile network 10, such as, for example, a mobility management entity (MME), a gateway (e.g., PGW, SGW), or a mobile base station (e.g., eNodeB).

Server 100 comprises processor 110, input/output (I/O) module 120, and memory 130. Memory 130 may be implemented using any suitable storage medium for storing software and/or operational data, such as an optical storage medium, a magnetic storage medium, an electronic storage medium, and/or a combination thereof. It will be appreciated that memory 130, or parts thereof, may be implemented as a physical component of server 100 and/or as a physical component of one or more secondary devices in communication with server 100. Memory 130 comprises at least TA optimization manager 140 and self-optimizing network (SON) data 145.

Processor 110 may be operative to execute instructions stored in memory 130. For example, processor 110 may be operative to execute TA optimization manager 140 or a component module of TA optimization manager 140, e.g., TAU optimizer 150, paging optimizer 160, and/or TA shaper 170. It will be appreciated that server 100 may comprise more than one processor 110. For example, one such processor 110 may be a special purpose processor operative to execute TA optimization manager 140 or at least one of its component modules to optimize at least one aspect of a TA's configuration. It will be appreciated that processor 110 may be implemented as a central processing unit (CPU), and/or one or more other integrated circuits such as application-specific integrated circuits (ASICs), field programmable gate arrays (FPGAs), full-custom integrated circuits, etc. or a combination of such integrated circuits.

I/O module 120 may be any suitable software or hardware component such as a universal serial bus (USB) port, disk reader, modem or transceiver that may be operative to use protocols such as are known in the art to communicate either directly, or indirectly, with elements of mobile network 10, such as, for example, a base station, an MME, a gateway, etc. over a communications network such as, for example, a backbone network, the Internet, or via a WiFi connection. It will be appreciated that the embodiments described herein may also support configurations where some or all of the communications between I/O module 120 and elements of mobile network 10 are brokered by a local server and forwarded to I/O module 120 over the Internet, a local area network, and/or a suitable wireless technology. At least some of the functionality attributed herein to server 100 may be also performed on such a local server. It will similarly be appreciated that since I/O module 120 is operative to communicate with elements of mobile network 10, the physical location of server 100 may not necessarily be within close proximity of any specific element(s) of mobile network 10.

TA optimization manager 140 and its component modules (e.g., TAU optimizer 150, paging optimizer 160, and TA shaper 170) may be an application implemented in hardware or software that may be executed by processor 110 in order to at least configure TAs 20 based on SON data 145.

Figure 3:
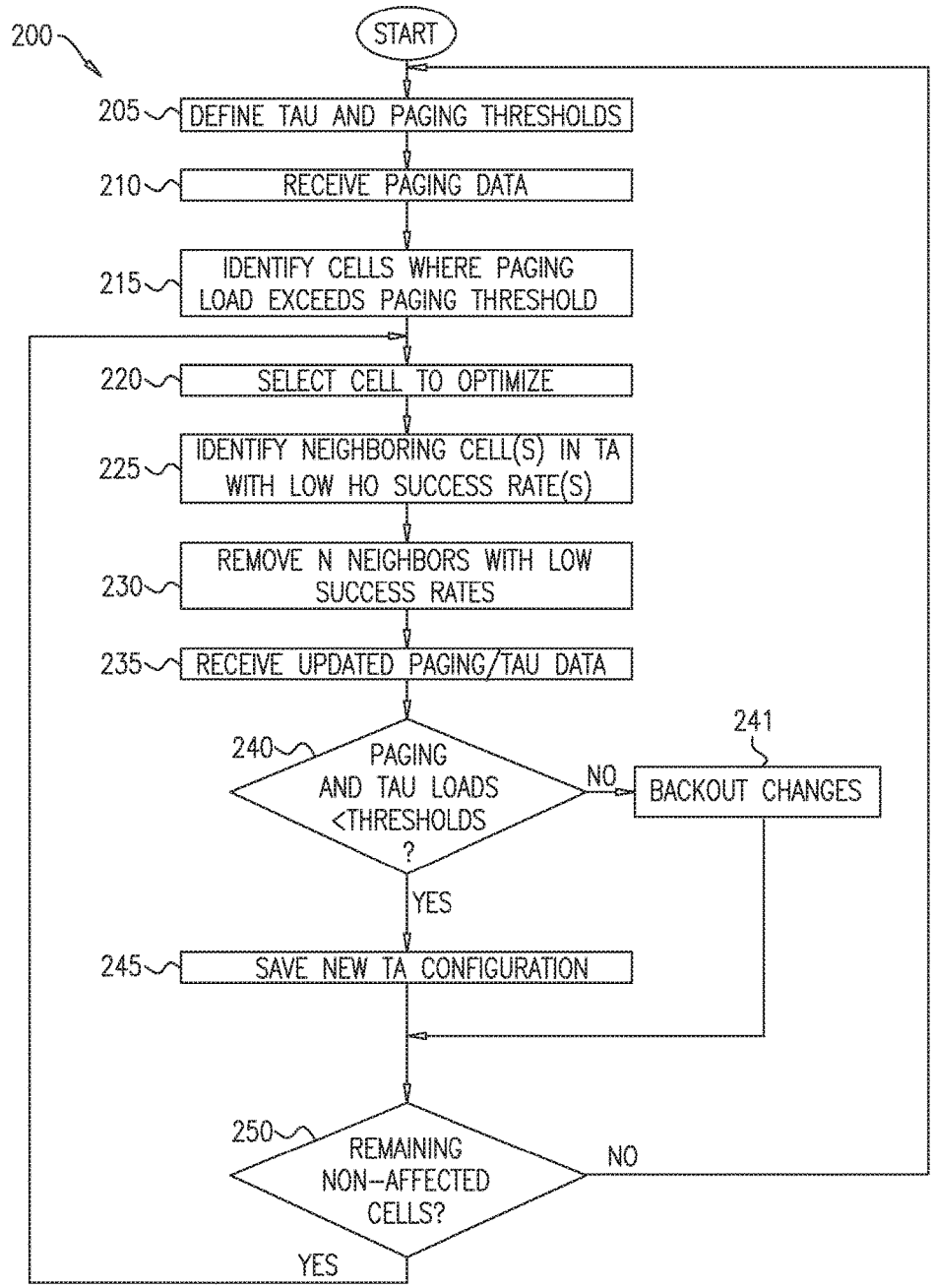
FIGS. 3-5 are flowcharts of optimization processes performed by the server of FIG. 2 for the tracking areas of FIGS. 1A-E.

Reference is now made to FIG. 3 which is flowchart of a TA paging optimization process 200 to be performed by TA optimization manager 140 in accordance with embodiments described herein. For the purposes of illustration, process 200 will be described herein respect to the exemplary mobile network depicted in FIGS. 1A-E, i.e., mobile network 10.

TA optimization manager 140 may define (step 205) thresholds for the number of TAUs and paging signals in the cells of mobile network 10 over a defined period of time. For example, the TAU threshold for cell 35 may be defined as 2,000 TAUs in an hour, and the paging signal threshold for cell 35 may be defined as 2,500 paging signals in hour. It will be appreciated that the relative values for the TAU and paging signal thresholds presented herein are by way of example only. In practice, the TAU threshold may alternatively be set at the same value as the paging signal threshold; similarly, the paging signal threshold may be set at a lower value than that of the TAU threshold.

The thresholds may be input manually into TA optimization manager 140 via a suitable interface, such as, for example, a mouse, keyboard, or a voice activated command interface. Alternatively, the thresholds may be uploaded from an external source for use by TA optimization manager 140 via I/O module 120. Alternatively, as will be described hereinbelow, TA optimization manager 140 may be configured to calculate such thresholds during a setup phase when the TAs are initially defined for the cells of a mobile network. It will be appreciated that the TAU and paging thresholds may be defined on a per cell basis. Alternatively, some or all of the thresholds may be defined on an individual TA basis, where the thresholds for all of the cells in a given TA may be defined identically. For example, cells 31-35 in TA 20A may all be defined with the same thresholds. Alternatively, some or all of the thresholds may be defined on a group basis, where, for example, values may be assigned for clusters of TAs, or according to tracking area lists (TALs), which are used by UEs to identify entry to a new TA, thereby prompting a TAU.

TA optimization manager 140 may receive (step 210) paging data for the TAs in mobile network 10. In accordance with embodiments described herein, such paging data may be accumulated with other operational data from the cells in mobile network 10 and accumulated and stored for reference by TA optimization manager 140 as SON data 145. Accordingly, step 210 may also involve TA optimization manager 140 receiving the relevant paging data from SON data 145.

TA optimization manager 140 may invoke paging optimizer 160 to identify (step 215) cells where the paging load as determined according to the paging data received from SON data 145 exceeds their respective defined paging thresholds. Paging optimizer 160 may select (step 220) an identified cell to optimize by adjusting its associated TA. For example, per the exemplary embodiment of FIG. 1A, cell 33 in TA 20A may exceed its defined paging threshold, and paging optimizer 160 may select it for optimization. The selection of specific cells in step 220, may be a function of how much the actual paging signals exceed the defined threshold, either in absolute, or relative, terms.

Paging optimizer 160 may identify (step 225) one or more neighboring cells to remove from the associated TA (e.g., TA 20A) according to one or more KPIs that indicate that there may be relatively low traffic between the selected cell and the identified neighboring cells. For example, paging optimizer 160 may use a KPI for handover (HO) success rate; a relatively low handover success rate between the selected cell and one or more of its neighboring cells may indicate that a UE in the selected cell is relatively unlikely to migrate to one of the identified neighboring cells. Alternatively, or in addition, may use a KPI associated a "ping pong" rate for successful hand overs, which may be indicative of the rate at which a UE crosses back and forth over the boundary of two cells. It will be appreciated that the data for this KPI may be retrieved from SON data 145 by paging optimizer 160.

Using the exemplary embodiment of FIG. 1A to illustrate, if the selected cell is cell 33 and neighboring cells 35 and 36 have a relatively low handover success rate with cell 33, it may indicate that a UE known to be in cell 33 may be unlikely to migrate to either of cells 35 or 36. Accordingly, when attempting to locate the UE, it may not be necessary for mobile network 10 to include cell 33 with cells 35 and 36 in the same paging area, i.e., the same TA. Paging optimizer 160 may therefore remove (step 230) the one or more identified neighboring cells (e.g., cells 35 and 36) from the associated TA. Step 230 may therefore yield the exemplary embodiment depicted in FIG. 1C, where new TAs 20A' and 20D' may be formed by transferring cells 35 and 36 from original TA 20A to original TA 20D.

It will be appreciated that the number of cells to remove in step 230 may be configurable and/or a function of the number of cells identified in step 225. Accordingly, as depicted in FIG. 3, step 230 is depicted in terms of "N" neighbors to represent the number of neighboring cells to remove. As shown in the exemplary embodiment of FIG. 1C, "N" may be equal to two. However, the embodiments described herein may support other values for "N".

TA optimization manager 140 may receive (step 235) updated paging and TAU data via I/O module 120 from the devices in mobile network 10. The updated paging and TAU data is based on the performance of the cell selected in step 220, as well as any other cells presumably affected by step 230, for example, the other cells in TA 20A' and TA 20D'. The updated paging and TAU data is gathered for a configurable period of time, such as, for example, an hour, two hours, four hours, a day, etc.

Using the updated paging and TAU data, TA optimization manager 140 may determine whether the paging and TAU loads are now under the thresholds for the optimized cell as well as the affected cells. It will be appreciated that in some instances, the performance of step 230 may not, over time, necessarily succeed in lowering the paging load under the paging load threshold in the optimized cell. Furthermore, while the performance of step 230 may indeed lower the paging load under the paging load threshold in the optimized cell, the reduction in size of the original TA may result in an increased TAU load, such that the TAU load of the optimized cell may now exceed the TAU load threshold. Also, even if both the paging and TAU loads are under their respective thresholds in the optimized cell, it is possible that the performance of step 230 negatively impacted some of the other affected cells (e.g., the cells of TAs 20' and 20D' per FIG. 1C), such that their paging and/or TAU loads now exceed their respective defined thresholds.

If the paging and/or TAU loads for the optimized cell and/or any of the affected cells increases subsequent to the performance of step 230 such that at least one of the loads exceeds its associated threshold, TA optimization manager 140 may back out (step 241), i.e., reverse, the changes performed in step 230. It will be appreciated however, that in the event that the paging and/or TAU load in an affected cell had already exceeded its associated threshold prior to the performance of step 230, the performance of step 241 may be contingent on whether or not the situation for the affected cell has worsened vis-à-vis the previous situation, i.e., whether or not the amount by which the paging or TAU load exceeds its respective threshold has increased.

If per the updated paging and TAU data (as received in step 235) the paging and TAU loads for the affected cells are less than their respective defined thresholds, TA optimization manager 140 may save (step 245) the new TA configuration. For example, per the exemplary embodiment of FIG. 1C, mobile network 10 may be permanently updated with TAs 20A' and 20D' in place of original TAs 20A and 20D.

It will be appreciated that the exemplary embodiment of FIG. 1C represents one of many possible outcomes from the operation of process 200. For example, in accordance with an exemplary embodiment, one or more of the cells may already have a paging load close to, or in excess of, its associated paging threshold. In such a case, it may be foreseeable that moving cells 35 and 36 to TA 20D may not be successful and that such a move would likely necessitate the performance of the back out of changes in step 241. For example, this may be foreseeable based on a previous, unsuccessful attempt to move cells 35 and 36 to TA 20D, or may alternatively be determined by paging optimizer 160 in view of the paging load statistics reviewed in step 225.

In accordance with embodiments described herein, if step 225 is unsuccessful in that paging optimizer 160 cannot identify cells to move to another TA 20, paging optimizer may divide a TA 20 into two (or more) TAs 20 in step 230. For example, as depicted in the exemplary embodiment of FIG. 1B, paging optimizer 160 may divide the cells of TA 20A into TAs 20 AA and TA 20AB.

As noted hereinabove, the optimization of a given cell may affect not only the other cells in the same TA, but also the cells in a neighboring TA. For example, the results of the optimization of cell 33 in FIG. 1A may affect not only the other cells in TA 20A, and also the cells in TA 20D. As depicted in FIG. 1C, TA 20D' may be larger than original TA 20D; thus illustrating that the cells in a neighboring TA may also be affected by the optimization of a cell in another TA. In accordance with embodiments described herein, such affected cells may be excluded from direct optimization for a period of time after they are affected by the optimization of another cell. In such manner, the determination of step 240 may be performed on the basis of the performance of step 230, without interference from other optimization measures.

Accordingly paging optimizer 160 may determine whether there are any remaining non-affected cells to optimize in mobile network 10 (step 250), i.e., that have not been directly optimized or otherwise affected in a recent iteration of process 200. It will be appreciated that that cells that have been optimized and/or affected by process 200 may be excluded in such manner for a configurable period of time, e.g., two, hours, four hours, twelve hours, a day, etc.

If per the determination in step 250 there are remaining cells to optimize in mobile network 10, process control may return to step 220, where another cell may be selected from as yet unaffected cells from among the population of cells that was identified in step 215. Otherwise, process control may return to step 205 and after a configurable period of time, process 200 may start over. Alternatively, step 205 may not be performed in each iteration of process 200, and some iterations of process 200 may begin with step 210.

Figure 4:
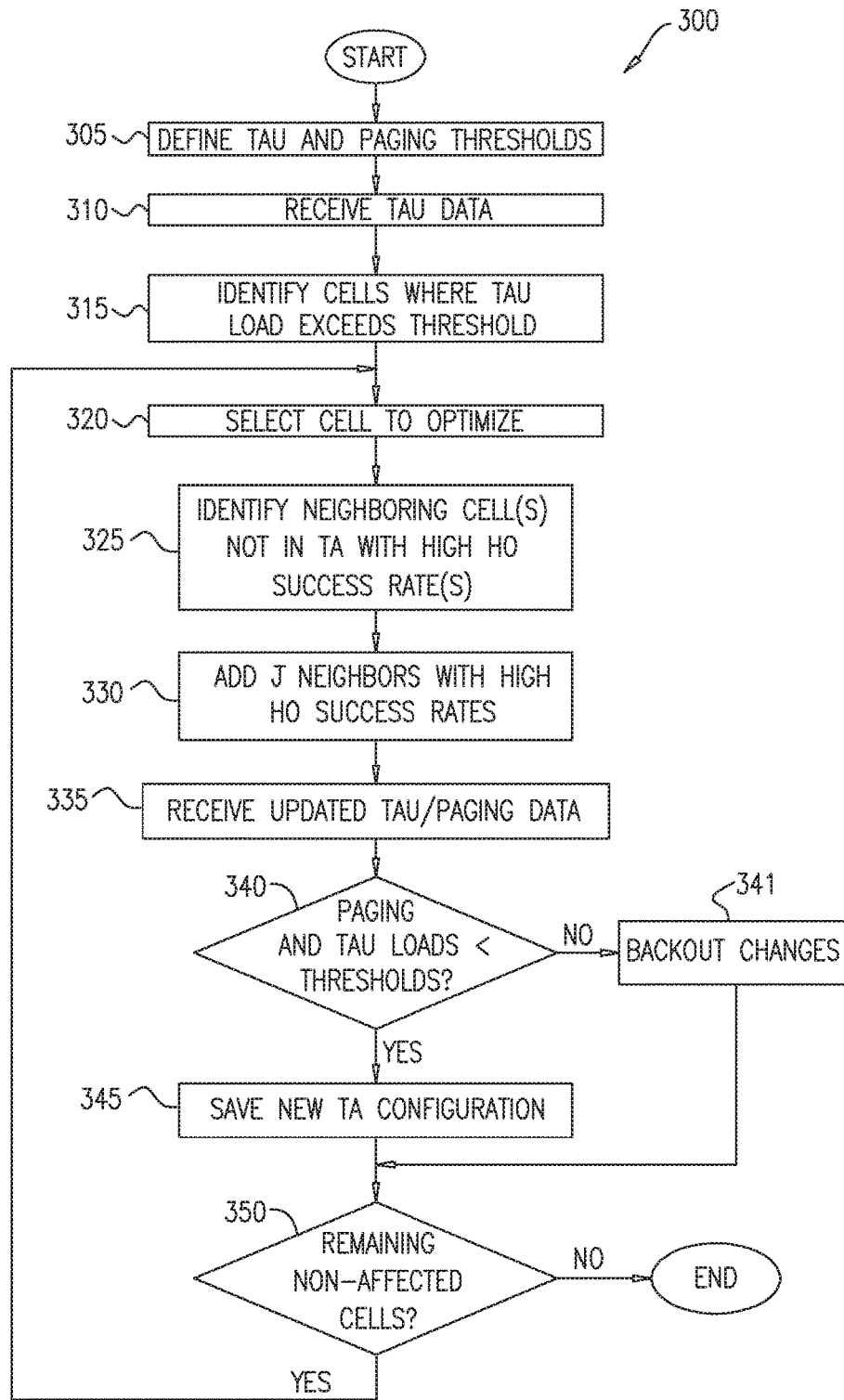

Reference is now made to FIG. 4 which is a flowchart of another TAU optimization process 300 performed by TA optimization manager 140 to further optimize the configuration of TAs, such as, for example, TAs 20 as depicted in (FIGS. 1A-E). In accordance with embodiments described herein, process 300 may optimize TAs 20 by leveraging excess TAU load capacity. TA optimization manager 140 may employ TAU optimizer 150 to perform some, or all, of the functionality of process 300.

In accordance with embodiments described herein, process 300 may be performed subsequent to process 200 in order to further optimize TAs 20 in mobile network 10 by addressing cells with TAU loads above their thresholds that were not directly or indirectly affected during a recent iteration of process 200. For example, process 300 may be employed to optimize cells for which changes implemented during process 200 were backed out in step 241. Process 300 may also be employed to optimize cells with high TAU loads that were not affected by a recent iteration of process 200 due to low paging loads. In accordance with other embodiments described herein, process 300 may be performed prior to process 200.

TA optimization manager 140 may define (step 305) thresholds for the number of TAUs and paging signals in the cells of mobile network 10 over a defined period of time. TA optimization manager 140 may perform step 305 in generally the same manner as step 205 in process 200. It will be appreciated that when process 300 is performed within a given period of time after process 200, it may not be necessary to perform step 305, as the relevant thresholds have already been defined, such that the TAU and paging thresholds may have already been defined for the cells in network 10.

TA optimization manager 140 may receive (step 310) TAU data for the TAs in mobile network 10. Similar to step 210 in process 200, such TAU data may be accumulated with other operational data from the cells in mobile network 10 and accumulated and stored for reference by TA optimization manager 140 as SON data 145. Accordingly, step 310 may involve TA optimization manager 140 receiving the relevant TAU data from SON data 145.

TA optimization manager 140 may invoke TAU optimizer 150 to identify (step 315) a population of cells where the TAU load, as determined according to the TAU data received from SON data 145, exceeds their respective defined TAU thresholds. TAU optimizer 160 may select (step 320) a cell to optimize by attempting to reduce its associated TAU load. For example, per the exemplary embodiment of FIG. 1C, cell 32 in TA 20A' may exceed its defined TAU threshold, and TAU optimizer 150 may select it for optimization. The selection of specific cells in step 220, may be, for example, a function of how much the actual TAU load exceeds the defined threshold, either in absolute, or relative, terms.

It will be appreciated that in step 320, TAU optimizer 160 may not select cells that have recently been affected, either directly or indirectly, by another optimization process, e.g., process 200. Accordingly, if TA 20A was recently configured by process 200 (as described hereinabove) to generate TA 20A', cell 32 may be considered to have been affected by a recent optimization process, and would therefore not be available for selection in a current iteration of step 320. It will be appreciated that a configurable period of time may be employed by TAU optimizer 160 to determine whether or not a cell has been recently affected in such manner.

TAU optimizer 150 may identify (step 325) one or more neighboring cells to add to the associated TA (e.g., TA 20A') according to one or more KPIs that indicate that there may be a relatively high rate of traffic between the selected cell and the identified neighboring cells. For example, TAU optimizer 150 may use the KPI for handover success rate discussed hereinabove; a relatively high handover success rate between the selected cell and one or more of its neighboring cells may indicate that a UE in the selected cell is relatively likely to migrate to one of the identified neighboring cells. It will be appreciated that TAU optimizer 150 may retrieve the data for the KPI from SON data 145.

For example, referring to the embodiment of FIG. 1C, the cell being optimized may be cell 32 of TA 20A'. In step 325, TAU optimizer 150 may identify cells 41 and 42 of TA 20B as having high handover success rates for handovers to and from cell 32. The high handover success rate may be determined as a function of a handover success rate threshold. It will be appreciated that handovers between cell 32 and cells 41 and 42 may contribute to the high TAU load observed for cell 32. Accordingly, TAU optimizer 150 may add (step 330) the one or more identified neighboring cells (e.g., cells 35 and 36) to the associated TA, e.g., TA 20A' per the embodiment of FIG. 1C.

It will be appreciated that the number of cells to add in step 330 may be configurable and/or a function of the number of cells identified in step 325. Accordingly, as depicted in FIG. 4, step 330 is depicted in terms of "J" neighbors to represent the number of neighboring cells to add. As shown in the exemplary embodiment of FIG. 1C, "J" may be equal to two. However, the embodiments described herein may support other values for "J".

Step 330 may therefore yield the exemplary embodiment depicted in FIG. 1D, where new TAs 20A" and 20B' may be formed by transferring cells 41 and 42 from original TA 20B to original TA 20A'.

TA optimization manager 140 may receive (step 335) updated paging and TAU data from via I/O module 120 from the devices in mobile network 10. The updated paging and TAU data is based on the performance of the cell selected in step 320, as well as any other cells presumably affected by step 330, for example, the other cells in TA 20A" and TA 20B'. The updated paging and TAU data is gathered for a configurable period of time, such as, for example, an hour, two hours, four hours, a day, etc.

Using the updated paging and TAU data, TA optimization manager 140 may determine whether the paging and TAU loads are now under the thresholds for the affected cells (step 340). It will be appreciated that in some instances, the performance of step 330 may not necessarily succeed in lowering the TAU load under the TAU load threshold in the optimized cell, i.e., cell 32 in FIG. 1D. Furthermore, while the performance of step 330 may indeed lower the TAU load under the TAU load threshold in the optimized cell, the increase in size of the original TA may result in an increased paging load, such that the paging load of the optimized cell may now exceed the paging load threshold. Also, even if both the paging and TAU loads are under their respective thresholds in the optimized cell, it is possible that the performance of step 330 impacted on some of the other affected cells (e.g., the cells of TAs 20A' and 20B per FIG. 1C), such that their paging and/or TAU loads now exceed their respective defined thresholds.

If the paging and/or TAU loads for the optimized cell and/or any of the affected cells increases subsequent to the performance of step 330 such that at least one of the loads exceeds its associated threshold, TA optimization manager 140 may back out (step 341), i.e., reverse, the changes performed in step 330. It will be appreciated however, that in the event that the paging and/or TAU load in an affected cell had already exceeded its associated threshold prior to the performance of step 330, the performance of step 341 may be contingent on whether or not the situation for the affected cell has worsened vis-à-vis the previous situation, i.e., has the amount by which the paging or TAU load exceeds its respective threshold increased.

If per the updated paging and TAU data (as received in step 335), the paging and TAU loads for the affected cells are less than their respective defined thresholds, TA optimization manager 140 may save (step 345) the new TA configuration. For example, per the exemplary embodiment of FIG. 1D, mobile network 10 may be permanently updated with TAs 20A" and 20B' in place of original TAs 20A' and 20B.

TAU optimizer 150 may determine whether there are any remaining non-affected cells to optimize in mobile network 10 (step 350), i.e., that have not been directly optimized or otherwise affected in the current iteration of process 300 and/or a recent iteration of either process 200, or process 300. It will be appreciated that cells that have optimized and/or affected by either process 200 or process 300 may be excluded in such a manner for a configurable period of time, e.g., two, hours, four hours, twelve hours, a day, etc.

If per the determination in step 350 there are remaining cells to optimize in mobile network 10, process control may return to step 320, where another cell may be selected from as yet unaffected cells from among the population of cells that was identified in step 315. Otherwise, process control may return to step 305 and after a configurable period of time, process 300 may start over. Alternatively, step 305 may not be performed in each iteration of process 300, and some iterations of process 300 may begin with step 310.

It will be appreciated that process 300 may also be used to combine two or more TAs as per the exemplary embodiment of FIG. 1E. For example, one of the cells in original TA 20C (FIGS. 1A-D) may have been selected for optimization in step 320. In step 325, several, or perhaps all, of the cells in original TA 20D (FIGS. 1A-D) may have been identified with high hand over success rates. In step 330 may adjust the value of "J" to represent all of the cells of TA 20D. In accordance with some embodiments described herein, TAU optimizer 150 may factor in a ratio for current TAU and paging signal loads for the affected cells when determining a value for "J". For example, if the affected cells of TAs 20C and 20D have relatively low paging signal loads accompanied by relatively high TAU loads, it may be possible to reduce the TAU loads without exceeding the paging load thresholds by combining TAs 20C and 20D. TAU optimizer 150 may therefore set "J" to a value that would include all of the cells in TA 20D, thereby rendering the result as depicted in FIG. 1E.

It will be appreciated that processes 200 and 300 as described hereinabove may be employed by TA optimization manager 140 to optimize paging and TAU loads by adjusting the size of affected TAs 20. It will be appreciated, however, that as described hereinabove, in some cases processes 200 and 300 may not successfully optimize a TA; after adding and/or removing cells to/from the TA, the paging load and/or the TAU load may still exceed defined threshold(s). In some cases, a TA may have an optimal size, yet the composition of the TA, i.e., the allocation of the cells in the TA, may be sub-optimal.

In accordance with embodiments described herein, UE traffic patterns may be leveraged to reshape a TA to optimize paging and TAU loads. For example, if a TA 20 is reshaped to include cells that approximate at least a majority of a typical UE's trajectory as it moves through the TA 20, the TAU load may be decreased since the UE may enter/exit the TA 20 less often. Similarly, the paging load may be decreased since the likelihood would increase that the UE would be in a given cell receiving the page; "unnecessary" paging signals would be offloaded to another TA 20.

Figure 5:
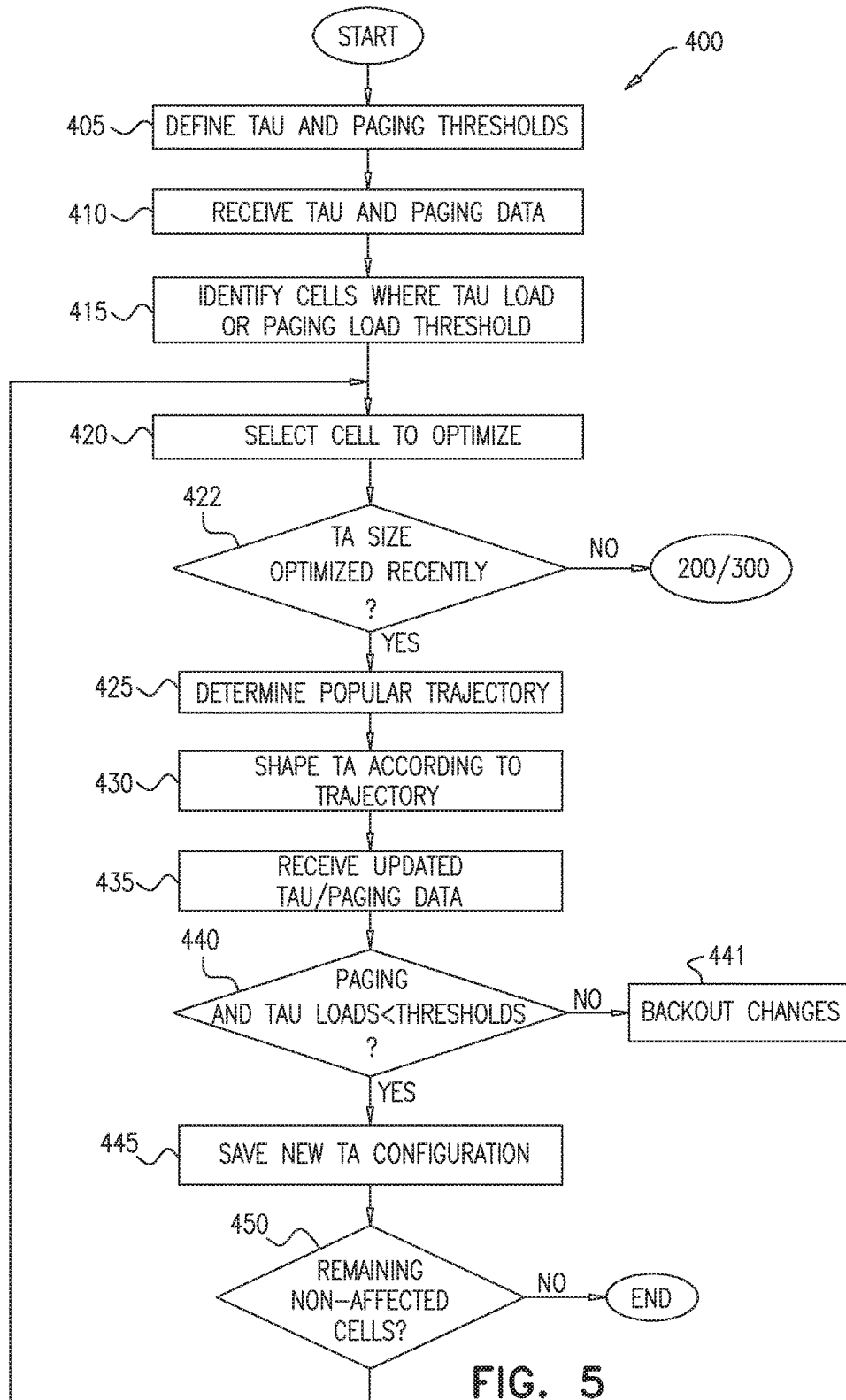

Reference is now made to FIG. 5 which is a flowchart of a TA paging optimization process 400 to be performed by TA optimization manager 140 in accordance with embodiments described herein. Process 400 may be performed on a periodic basis before, or after, the performance of process 200 and/or process 300. Alternatively, or in addition, process 400 may be performed on a per cell basis by TA optimization manager 140 on cells that were previously processed unsuccessfully by process 200 and/or process 300, i.e., where attempts to optimize the performance of a cell by adding and/or removing cells from an associated TA were unsuccessful.

TA optimization manager 140 may define (step 405) thresholds for the number of TAUs and paging signals in the cells of mobile network 10 over a defined period of time. TA optimization manager 140 may perform step 405 in generally the same manner as steps 205/305 in process 200/300. It will therefore be appreciated that when process 400 is performed within a given period of time after process 200/300, it may not be necessary to perform step 405, as the relevant thresholds have already been defined, such that the TAU and paging thresholds may have already been defined for the cells in network 10.

TA optimization manager 140 may receive (step 310) TAU and paging data for the TAs in mobile network 10. Functionally similar to the performance of both step 210 in process 200 and step 310 in process 300, such TAU and paging data may be accumulated with other operational data from the cells in mobile network 10 and accumulated and stored for reference by TA optimization manager 140 as SON data 145. Accordingly, step 410 may involve TA optimization manager 140 receiving the relevant TAU data from SON data 145.

TA optimization manager 140 may invoke TA shaper 170 to identify (step 415) a population of cells where at least one of the TAU load or the paging load (as determined according to the data received from SON data 145) exceeds a respective defined threshold. TA shaper 170 may select (step 420) a cell to optimize by reshaping its configuration. For example, per the exemplary embodiment of FIG. 1A, the paging load and/or TAU load in cell 32 in TA 20A may exceed its associated threshold, and TA shaper 170 may select it for optimization. The selection of specific cells in step 420, may be, for example, a function of how much the actual TAU/paging load exceeds the defined threshold, either in absolute, or relative, terms.

It will be appreciated that in step 420, TA shaper 170 may not select cells that have recently been affected, either directly or indirectly, by another optimization process, e.g., process 200 or process 300. Accordingly, if TA 20A was recently configured by process 200 or process 300 (step 422), cell 32 may be considered to have been affected by a recent optimization process, and would therefore not be available for optimization in a current iteration of process 400. It will be appreciated that a configurable period of time may be employed by TA shaper 170 to determine whether or not a cell has been recently affected in such manner.

It will also be appreciated that, as noted hereinabove, TA optimization manager 140 may perform process 400 in order to optimize a specific cell or TA 20 for which the optimization of processes 200 and/or 300 were unsuccessful, i.e., that changes to the associated TA were backed out in either step 241 of process 200, or step 341 of process 300. In such a case, steps 405-422 may be unnecessary and process 400 may be started from step 425.

TA shaper 170 may determine (step 425) a popular trajectory for UEs moving through the cell selected for optimization. For example, using the exemplary embodiment of FIG. 1A, cell 32 may be selected for optimization. TA shaper 170 may use inter-cell handover success rate to track typical traffic flows for UEs as they move into and out of cell 32. For example, the most popular trajectory of UEs reaching cell 32 may conform to the route of a highway that runs through cells 33 and 34 of TA 20A, crosses over to a cell in TA 20B, returns to TA 20A in cell 32, and then continues to a different cell in TA 20B.

TA shaper 170 may shape (step 430) TA 20A based on the most popular trajectory involving the cell selected for optimization, e.g., cell 32. It will be appreciated that UEs in cars moving along the highway may generate a relatively high TAU load for the cells of TA 20A as they move in and out of TA 20. It will also be appreciated that, as per the example, the trajectories of UEs in cells 35 and 36 may be less likely to include cell 32; cells 35 and 36 may be relatively infrequently visited by UEs migrating to and from cell 32. Accordingly, the TAU load for cell 32 may be reduced by adding the neighboring cells from TA 20B, and the paging load may be reduced by removing cells 35 and 36 from TA 20A. The exemplary embodiment of FIG. 1D may depict the result of step 430: cells 35 and 36 have been added to TA 20D to form TA 20D'; and cells 41 and 42 have been added to TA 20A to form TA 20A" and yield TA 20B'.

It will be appreciated that the number of cells added and removed in step 430 may be configurable and/or a function of the number of cells in the popular trajectory identified in step 425. Similarly, in some embodiments the number of cells removed may not necessarily equal the number of cells added.

TA optimization manager 140 may receive (step 435) updated paging and TAU data via I/O module 120 from the devices in mobile network 10. The updated paging and TAU data is based on the performance of the cell selected in step 420, as well as any other cells presumably affected by step 330, for example, the other cells in TA 20A", TA 20B', and TA 20D' in FIG. 1D. The updated paging and TAU data is gathered for a configurable period of time, such as, for example, an hour, two hours, four hours, a day, etc.

TA optimization manager 140 may use the updated paging and TAU data to determine whether the paging and TAU loads are now under the thresholds for the affected cells (step 440). It will be appreciated that in some instances, the performance of step 430 may not necessarily succeed in lowering the TAU and/or paging loads under their respective thresholds in the optimized cell, i.e., cell 32 in FIG. 1D. Furthermore, while the performance of step 430 may indeed optimize the TAU and paging loads, it is possible that the performance of step 430 impacted some of the other affected cells (e.g., the cells of TA 20A", TA 20B', and TA 20D' in FIG. 1D), such that their paging and/or TAU loads now exceed their respective defined thresholds.

If the paging and/or TAU loads for the optimized cell and/or any of the affected cells increases subsequent to the performance of step 430 such that at least one of the loads exceeds its associated threshold, TA optimization manager 140 may back out (step 441), i.e., reverse, the changes performed in step 430. It will be appreciated however, that in the event that the paging and/or TAU load in an affected cell had already exceeded its associated threshold prior to the performance of step 330, the performance of step 441 may be contingent on whether or not the situation for the affected cell has worsened vis-à-vis the previous situation, i.e., if the amount by which the paging or TAU load exceeds its respective threshold has increased.

If per the updated paging and TAU data (as received in step 435) the paging and TAU loads for the affected cells are less than their respective defined thresholds, TA optimization manager 140 may save (step 445) the new TA configuration. For example, per the exemplary embodiment of FIG. 1D, mobile network 10 may be permanently updated with TAs 20A", 20B' in place of original TAs 20A' and 20B.

TAU optimizer 150 may determine whether there are any remaining non-affected cells to optimize in mobile network 10 (step 450), i.e., that have not been directly optimized or thereby affected in the current iteration of process 400 and/or a recent iteration of either process 200, or process 300. It will be appreciated that cells that have been optimized and/or affected by either process 200 or process 300 may be excluded in such manner for a configurable period of time, e.g., two, hours, four hours, twelve hours, a day, etc.

If per the determination in step 450 there are remaining cells to optimize in mobile network 10, process control may return to step 420, where another cell may be selected from as yet unaffected cells from among the population of cells that was identified in step 415. Otherwise, process control may return to step 405 and after a configurable period of time, process 400 may start over. Alternatively, step 405 may not be performed in each iteration of process 400, and some iterations of process 400 may begin with step 410.

In accordance with some embodiments described herein, TA shaper 170 may also be operative to address "ping-pong" TAU activity where UEs repeatedly crosses back and forth over the boundary of two TAs 20. It will be appreciated that such activity may generate an increase in TAU activity for all of the cells in both of their respective TAs 20. In order to account for ping-pong activity, step 425 may also comprise detecting a ping-pong trajectory. For example, as per the exemplary embodiment of FIG. 1C, there may be a high rate of ping-pong activity between cell 32 in TA 20A' and cell 41 in TA 20B. TA shaper 170 may use available KPIs for the number of times a UE Ping Pongs between two cells to map the ping-pong trajectory between cell 32 and cell 41. If the frequency of ping-pong activity exceeds a defined threshold, in step 430 TA shaper 170 may shape the affected TAs 20 to ensure that cells 32 and cell 41 are in the same TA 20. For example, if cell 32 was the cell selected for optimization in step 420, cell 41 may be added to TA 20A'; if cell 41 was the cell selected for optimization in step 420, cell 32 may be added to TA 20B.

In accordance with embodiments described herein, TA optimization manager 140 may also be operative to reconfigure TAs 20 to address sudden spikes in TAU loads that may occur when large numbers of UEs enter/exit a TA at the same time. For example, at mass transport terminals such as airports or train/bus stations, a large number of people may cross a TA boundary at generally the same time, resulting in a sudden, short surge of TAU signaling.

TA optimization manager 140 may attempt to prevent such sudden spikes by using multiple versions of the TAs 20 in the vicinity of a location where the spikes are observed to occur regularly. For example, using the exemplary embodiment of FIG. 1D, a train station may be located in cell 42. TA optimization manager 140 may detect a spike in TAUs from cell 42 when a train arrives in the station and several UEs on board the train send TAUs at roughly the same time. In response, TA optimization manager 140 may effectively stagger a next wave of TAUs by instructing the MME to provide different TAL versions to the UEs in cell 42. Some of the UEs may receive a TAL referencing TA 20A" as shown in FIG. 1D. Other UEs may receive a TAL referencing TA 20B as shown in FIG. 1A. Other UEs may receive a TAL for a third TA 20 that may be formed, for example, by adding cell 42 to TA 20D as shown in FIG. 1A. It will be appreciated that by assigning staggered TALs to different UEs, a next spike in TAUs may be prevented when the UEs cross another TA boundary.

Alternatively, or in addition, TA optimization manager 140 may use analysis of SON data 145 to anticipate such sudden spikes before they occur, based on historical TAU trends. It will be appreciated that TA optimization manager 140 may be configured to use machine learning algorithms such as are known in the art to detect regular patterns to anticipate upcoming TAU spikes. In such a case, TA optimization manager 140 may instruct the MME to provide staggered TALs to UEs in the affected cell (e.g., cell 42) regardless of whether or not a spike in TAU signals was actually observed in real time.

It will be appreciated that processes 200, 300, and/or 400 may be configured to run on a periodic basis with intervening "sleep" periods during which additional SON data 145 may be collected. For example, 200, 300, and/or 400 may be configured to run at daily, weekly, monthly, etc. intervals using SON data 145 from a time period generally corresponding to an associated processing interval.

In accordance with embodiments described herein, TA optimization manager 140 may also be operative to provide an initial configuration of tracking areas 20 during deployment of mobile network 10. TA optimization manager 140 may employ known metrics such as the geographical locations of mobile base stations, azimuth and beam-width settings, and cell coverage range as indicated by timing advance and/or propagation delay information as inputs to a tracking area initial configuration process.

In accordance with the tracking area initial configuration process, co-sector cells, co-located cells and/or cells within a configured distance (e.g. 1 km) will initially be considered to be part of a same tracking area. To determine a TAL, cells with location (latitude and longitude) information may be divided into a configured number of distinct groups using a graph theory algorithm for partitioning connected weighted graphs using distance as the weight. The resulting distinct graphs may be allocated to unique tracking area lists, based on tracking areas present in a distinct group.

It will be appreciated that the embodiments described herein may provide optimization of the size and/or shape of tracking areas in order to more optimally manage paging and tracking area updates in a mobile network. It will similarly be appreciated that the embodiments described herein may leverage KPIs for geographic information and/or KPIs readily derivable from existing network elements to optimize the tracking areas. Accordingly, some, or all of the disclosed system and/or methods may be implemented in software without specialized hardware and/or firmware upgrades. Furthermore, each change to a tracking area configuration may be reviewed after a period of time to assess the efficacy of the change, both in terms of the focus of the change, i.e., a given cell and/or its associated tracking area, as well as other cells that may be affected by the change.

It will also be appreciated that the embodiments described herein address both paging and tracking area update loads in order to provide an optimal overall configuration. It will similarly be appreciated that the embodiments described herein may focus on addressing cells with salient load issues in order to more equitably redistribute paging/TAU loads throughout a given tracking area and/or network segment.

It will also be appreciated that the embodiments described herein may support periodic autonomous operation, thereby providing enhanced network performance without necessitating manual operation.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. A tracking area (TA) optimization apparatus comprising:
 a processor;
 a memory; and
 a TA optimization manager application, instantiated in said memory and configured to be executed by said processor to at least:
  use control signal data to select at least one cell to optimize in a TA of a mobile network, wherein said at least one cell is associated with at least one control signal load that exceeds an associated control signal load threshold, wherein said at least one control signal load is determined according to said control signal data, and is at least one of tracking area update (TAU) load or paging load,
  reconfigure said TA to form a reconfigured TA by at least one of: adding at least one additional cell from another TA to said TA, or removing at least one other cell from said TA,
  temporarily implement said reconfigured TA in said mobile network,
  for a configurable period of time, receive updated control signal data associated with both said at least one control signal load and a second control signal load for cells affected by said reconfigured TA, and
  upon determining according to said updated control signal data that said at least one control signal load is under said associated control signal load threshold and that said second control signal load is under an associated second control signal load threshold for said cells affected by said reconfigured TA, save said reconfigured TA for continued use in said mobile network.

2. The TA optimization apparatus according to claim 1 wherein said cells affected by said reconfigured TA include at least all other cells in said reconfigured TA.

3. The TA optimization apparatus according to claim 1 wherein said cells affected by said reconfigured TA include at least one cell in at least one neighboring TA, wherein said at least one neighboring TA was reconfigured by said TA optimization apparatus performing at least one of: removing said one additional cell from said at least one neighboring TA to be added to said TA, or adding said at least one other cell removed from said TA to said at least one neighboring TA.

4. The TA optimization apparatus according to claim 1 wherein said TA optimization manager is further configured to wait a configurable period of time after said reconfigured TA is saved for continued use in said mobile network before selecting said at least one cell to be optimized from among said cells affected by said reconfigured TA.

5. The TA optimization apparatus according to claim 1 wherein said TA optimization manager is further configured to select said at least one cell according to a measure of how much said at least one control signal load exceeds said associated control signal load threshold, wherein said measure is either a percentage or an absolute amount.

6. The TA optimization apparatus according to claim 1 wherein said TA optimization manager is further configured to use at least inter-cell handover success rate to determine which at least one additional cell from another TA to add to said TA, and which at least one other cell to remove from said TA.

7. The TA optimization apparatus according to claim 1 wherein said TA optimization manager is further configured to use:
 a first number of additional cells to determine a number of cells to be added when adding said at least one additional cell from another TA to said TA; and
 a second number to determine a number of other cells to be removed when removing said at least one other cell from said TA.

8. The TA optimization apparatus according to claim 7 wherein at least one of said first number and second number is configurable.

9. The TA optimization apparatus according to claim 7 wherein said first number is determined according to inter-cell handover success rates between said at least one cell and said at least one additional cell from another TA.

10. The TA optimization apparatus according to claim 7 wherein said second number is determined according to inter-cell handover success rates between said at least one cell and said at least one other cell from said TA.

11. The TA optimization apparatus according to claim 1 wherein said TA optimization manager comprises:
 a paging optimizer configured to:
  identify said at least one cell according to said paging load exceeding an associated paging load threshold, and
  reduce said paging load for said at least one other cell by removing said at least one other cell from said TA, wherein said at least one control signal load is paging load and said second control signal load is TAU load.

12. The TA optimization apparatus according to claim 1 wherein said TA optimization manager comprises:
a TAU optimizer configured to:
identify said at least one cell according to said TAU load exceeding an associated paging load threshold, and
reduce said TAU load for said at least one other cell by adding at least one additional cell from said another TA, wherein said at least one control signal load is TAU load and said second control signal load is paging load.

13. The TA optimization apparatus according to claim 1 wherein said TA optimization manager further comprises:
a TA shaper configured to:
identify said at least one cell according to at least one of said TAU load exceeding an associated paging load threshold, or said paging load exceeding an associated paging load threshold;
use inter-cell handover success statistics to identify a popular trajectory for user equipments (UEs) migrating through said at least one cell; and
reconfigure said TA to form said reconfigured TA by removing at least one infrequently visited cell from said TA, and adding frequently visited cells from said another TA, wherein said infrequently visited cells and said frequently visited cells are identified according to said popular trajectory.

14. The TA optimization apparatus according to claim 13 wherein said TA shaper is further configured to:
use TAU data to identify said popular trajectory as a ping-pong trajectory, wherein said UEs cross back and forth over the boundary of said TA and said another TA.

15. The TA optimization apparatus according to claim 13 wherein said TA optimization manager is further configured to:
use TAU data to identify said at least one cell according to spikes in said TAU load, wherein said spikes are indicative of multiple UEs expected to send TAUs in said TA in a short period of time; and
reduce said spikes by assigning at least two versions of said TA for use by said multiple UEs when in said at least one cell, wherein said at least two versions have different lists of cells in said TA.

16. The TA optimization apparatus according to claim 1 and further comprising an input/output (I/O) module operative to:
receive said control signal data and said updated control signal data from cells in said mobile network;
receive inter-cell handover success statistics from said cells in said mobile network.

17. The TA optimization apparatus according to claim 1 wherein said TA optimization apparatus is implemented on a mobile management entity (MME).

18. The TA optimization apparatus according to claim 1 wherein said TA optimization manager is further configured to combine two or more TAs to form a single TA.

19. A method for optimizing tracking area (TA) configurations in a mobile network, the method implemented on a computing device and comprising:
identifying at least one cell to optimize in a TA of a mobile network, wherein said at least one cell is associated with at least one signal load in excess of a defined signal load for said at least one cell, wherein said at least one signal load is at least one of a tracking area update (TAU) load or a paging signal load;
reconfiguring said TA to form a reconfigured TA by at least one of: adding at least one additional cell from another TA to said TA, or removing at least one other cell from said TA;
temporarily implementing said reconfigured TA in said mobile network;
for a configurable period of time, receiving updated control signal data associated with both said at least one control signal load and a second control signal load for cells affected by said reconfigured TA;
upon determining according to said updated control signal data that said at least one control signal load is under said associated control signal load threshold and that said second control signal load is under an associated second control signal load threshold for said cells affected by said reconfigured TA, save said reconfigured TA for continued use in said mobile network.

20. The method of claim 19, wherein said cells affected by said reconfigured TA include at least all other cells in said reconfigured TA.

21. The method of claim 19, wherein said cells affected by said reconfigured TA include at least one cell in at least one neighboring TA, wherein said at least one neighboring TA was reconfigured by said computing device performing at least one of: removing said one additional cell from said at least one neighboring TA to be added to said TA, or adding said at least one other cell removed from said TA to said at least one neighboring TA.

22. The method of claim 19, further comprising using at least inter-cell handover success rate to determine which at least one additional cell from another TA to add to said TA, and which at least one other cell to remove from said TA.

23. One or more non-transitory computer readable storage media encoded with instructions that, when executed by a processor, cause the processor to:
identify at least one cell to optimize in a TA of a mobile network, wherein said at least one cell is associated with at least one signal load in excess of a defined signal load for said at least one cell, wherein said at least one signal load is at least one of a tracking area update (TAU) load or a paging signal load;
reconfigure said TA to form a reconfigured TA by at least one of: adding at least one additional cell from another TA to said TA, or removing at least one other cell from said TA;
temporarily implement said reconfigured TA in said mobile network;
receive updated control signal data associated with both said at least one control signal load and a second control signal load for cells affected by said reconfigured TA;
save said reconfigured TA for continued use in said mobile network upon determining according to said updated control signal data that said at least one control signal load is under said associated control signal load threshold and that said second control signal load is under an associated second control signal load threshold for said cells affected by said reconfigured TA.

24. The one or more non-transitory computer readable storage media of claim 23, wherein said cells affected by said reconfigured TA include at least all other cells in said reconfigured TA.

25. The one or more non-transitory computer readable storage media of claim 23, wherein said cells affected by said reconfigured TA include at least one cell in at least one neighboring TA, wherein said at least one neighboring TA was reconfigured by said instructions being executed by the processor to perform at least one of: removing said one additional cell from said at least one neighboring TA to be added to said TA, or adding said at least one other cell removed from said TA to said at least one neighboring TA.

26. The one or more non-transitory computer readable storage media of claim 23, wherein the instructions, when executed by the processor, further cause the processor to use at least inter-cell handover success rate to determine which at least one additional cell from another TA to add to said TA, and which at least one other cell to remove from said TA.

\* \* \* \* \*